United States Patent [19]

Milan

[11] 4,416,509

[45] Nov. 22, 1983

[54] UNIVERSAL REFLECTOR OF ELECTROMAGNETIC WAVES MOUNTED ON A FLOAT

[76] Inventor: Drndarski Milan, Evgenija Kumičiča br. 12, 24000 Subotica, Yugoslavia

[21] Appl. No.: 265,641

[22] Filed: May 20, 1981

[30] Foreign Application Priority Data

May 26, 1980 [YU] Yugoslavia ............................ 1416/80

[51] Int. Cl.³ .......................................... G02B 5/122
[52] U.S. Cl. .................................... 350/102; 441/20
[58] Field of Search ................. 350/97, 102, 103, 109; 441/1, 20, 28; 116/26

[56] References Cited

U.S. PATENT DOCUMENTS

| | | | |
|---|---|---|---|
| 1,813,874 | 7/1931 | Eskilson | 350/102 |
| 2,534,710 | 12/1950 | Golian et al. | 441/20 |
| 2,604,644 | 7/1952 | Tilton | 441/20 |
| 3,039,093 | 6/1962 | Rockwood | 350/102 |
| 3,365,790 | 1/1968 | Brauer | 350/102 |
| 4,053,233 | 10/1977 | Bien et al. | 350/102 |
| 4,208,097 | 6/1980 | Yorgensen | 350/97 |

*Primary Examiner*—R. A. Rosenberger
*Attorney, Agent, or Firm*—Peter J. Georges

[57] ABSTRACT

The subject of the invention is the universal reflector of electromagnetic waves mounted on the float which in any position reflects electromagnetic waves back to the source of the emission, that is, to the receiver. The reflected electromagnetic wave has a direction parallel to the direction of incoming emitted electromagnetic beam.

5 Claims, 5 Drawing Figures

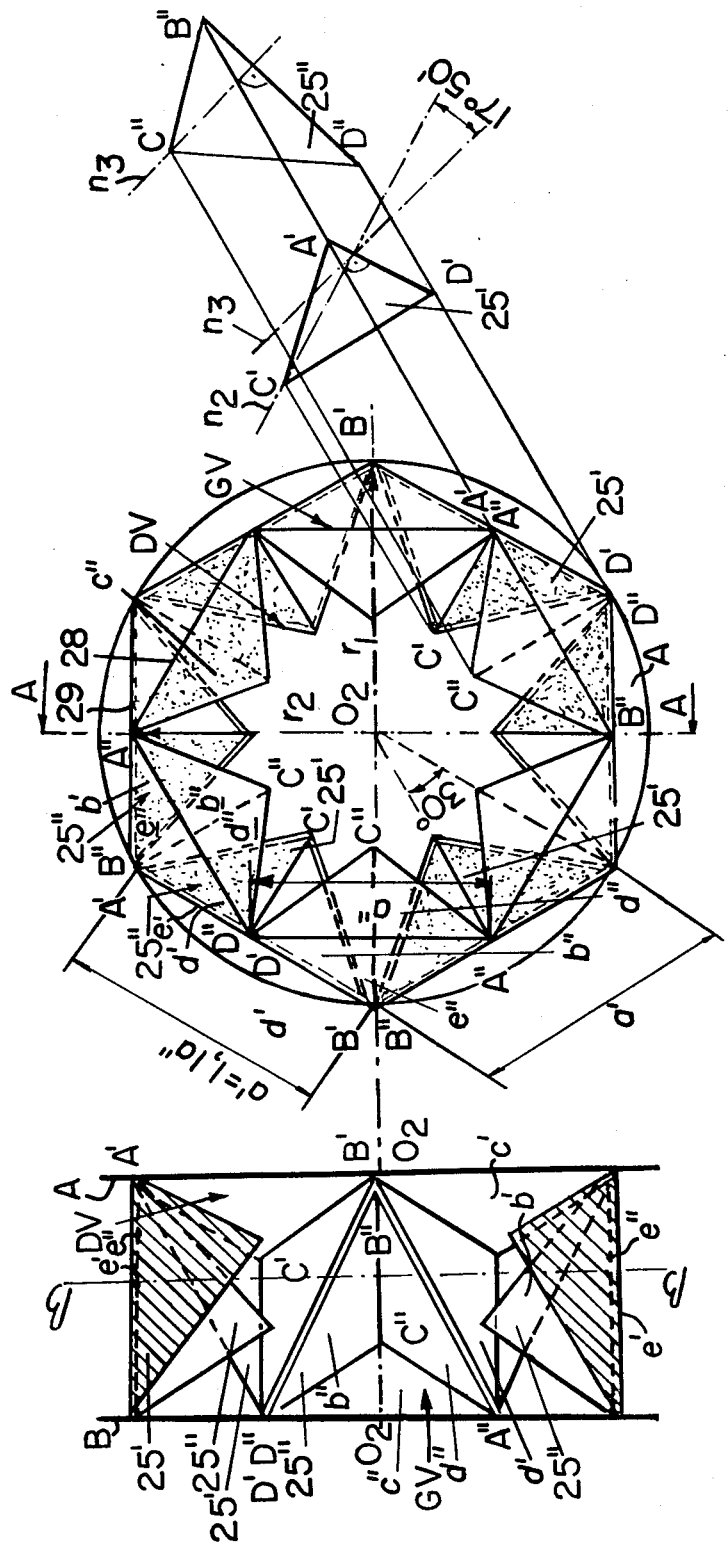

UNIVERSAL REFLECTOR OF ELECTROMAGNETIC WAVES MOUNTED ON A FLOAT

FIELD OF THE INVENTION

The subject of the invention is a universal reflector of electromagnetic waves mounted on a float which in any position reflects electromagnetic waves back to the source of the emission, that is, to a sender/receiver. The reflected electromagnetic wave has a direction parallel to the direction of the incoming electromagnetic beam.

BACKGROUND OF THE INVENTION

In measurements of distance between two points, a very important advance has been made by using electromagnetic waves. The distance can be calculated if the measured time of the waves spreading from the transmitter to the reflector is multiplied by the known velocity of the waves.

The purpose of the universal reflector according to the invention is that it can be applied for the measurements of hydraulic parameters in rivers and other water currents, especially for streamlines and trajectories. Further, for the measurements of water velocity, sea-level altitude of the water surface according to the principle of placing the instrument which generates and emits electromagnetic waves (transmitter) and at the same time receives the reflected waves (receiver) in one point.

The range of the classical optics is a very small part of the whole spectrum of electromagnetic radiation, the visible part of the spectrum being between 4000 Ån and 7500 Ån (Ångström).

Electromagnetic telemeters applied in this range are known as electro-optical telemeters. Among the most efficient available electro-optical instruments are the laser telemeters because of their special possibilities of scope, accuracy, and efficiency.

The most important advantage of the laser beam is its monochromity and coherence. These characteristics of laser beams mean that the laser light waves are co-ordinated in time and space. The monochromity of the laser light is $250 \times 10^6$ and the stability of frequency is $10^7$ times superior to the monochromity of ordinary light.

In the group of electro-optical and laser telemeters, simple plane mirrors or prisms have been applied as reflectors up to now. However, such reflectors have to be carefully oriented normally to the direction of the incoming electro-optical beam in order to reflect the incoming beam to the instrument (receiver).

When measuring the distance to an immobile object whict can be reached, the orientation of the mirror or the prism normally to the direction of the measuring distance has been performed by standard treatment known in physics and geodesy.

When measuring a moving object (e.g., a float in a water stream), its position must be determined in another way, since the demanded hydraulic parameters are defined by its movement. The float thrown into the water stream and carried by the water flow describes the trajectory (geometrical locus of points through which a part of a fluid passes on its way through the space), by the line of consecutive positions, that is the streamline (the line which refers to a definite moment in time and at each point has a tangent in the direction of the velocity at that point). Both lines, the trajectory and the streamline have tangents in the direction of the velocity, but the tangents of the trajectory refer to the velocity of the same part in different moments, and the tangents of the streamlines refer to the simultaneous velocities of different parts. The trajectories and the streamlines are the same in fixed (i.e., stable) currents.

Since a float is mobile and can not be reached, its position has been determined by means of two theodolites cutting the direction at the same moment. This has been done by measuring the horizontal connecting angles—the method known in geodesy as "cutting forward". The position of the float in horizontal projection (that is, only with x, y co-ordinates) has been determined. The horizontal projection of the streamline (trajectory) has been obtained on the map or plan by connecting the series of such consecutive points.

The simultaneity of measuring the horizontal angles is obtained by using visual-optical or auditory signals or by taking the readings at determined time intervals. In any case, the "forced measurement" was always performed by one theodolite not when it was favourable, but when it had to be done. The transmission of these signals from one to the other instrument needed numerous personnel to perform the measurements, and an accumulation of inevitably delay occurred which lead to considerable error in determining the horizontal position of the float. The accuracy of determining the float position by this method is about ±50 cm, according to some lacking data in the references and some author's analysis.

Electro-optical instruments have been made in combination with theodolites in recent years, and they operate together with the telescope of theodolites so that distance and both vertical and horizontal angles can be measured at the same time. Next to the reflector which reflects electromagnetic impulses there has to be a sight-mark in which the sighting is performed by the optical axis of the teodolite. The distance between the electro-optical beam and the optical axis of the theodolite is constant for the determined combination.

Many new eletro-optical instruments (especially laser telemeters) have their own limbs (horizontal and vertical), and it is possible to place the laser beam in the direction of the optical axis of the theodolite telescope. That is, the laser beam has in a way materialized the optical axis of the theodolite. In the situation like this, sighting into the reflector is at the same time sighting into the sight point of the optical system in order to measure the horizontal and vertical angles.

Very simple floats which float on the water surface have been constructed for measurements by floats. One of the simple floats is a cross-float made of two boards put crosswise. In the middle of such a float a holder is mounted with a sight-mark on it.

Other kinds of floats have been used, including one made of a round wooden board with a weight hanging on it to make the float stable. On the upper part of the board, which is above the water level, the sight-mark is mounted.

Other floats are of cylindrical shape with the bases of cone shape. A weight is hung on the lower basis, and the lower basis and the sight-mark are mounted on the upper basis.

All of the foregoing kinds of floats are imperfect. They are unstable in the water, the wind and water waves can easily turn or overturn them, and the direct distance from the float and the instrument can not be measured by them.

Some trilateral prisms are known (triple prisms, cube prisms, retrodirected prisms) which have been used for measurements with electro-optical and laser telemeters, especially when a quick measurement of detailed points on the terrain has been performed, and the surveyor's assistant should not pay attention to his orientation towards the instrument. These prisms reflect the light beam to ±20° angle of incidence to the main normal.

The technical problem solved or ameliorated by the subject invention is how to measure the distance by electro-optical and laser telemeter to a moving object which during its movement takes arbitrary positions which are not foreseen or determined. Specifically, the subject invention permits, by means of a telemeter, the measuring of the surface and deep streamlines and trajectories in open water currents, rivers, seas and lakes, and the measuring by means of a telemeter of the water velocity and the sea-level altitude of the water surface through a reflector from which the emitted electromagnetic wave or beam is reflected back to the source of emission—the receiver.

SUMMARY OF THE INVENTION

These technical problems have been solved and the imperfections of the prior art have been ameliorated eliminated by a universal reflector of electromagnetic waves mounted on a float. The universalt reflector is a reflector which in any position reflects electromagnetic and optical waves ones in parallel to their incoming direction, that is, to the receiver of the measuring instrument. With the use of this reflector, it is possible to measure the distance between the instrument and the float with the reflector directly, in any moment, by following the float.

A further characteristic of the universal reflector according to the invention is that it is suitable for application of electro-optical and laser telemeters for measuring the distance to the moving object, the time of measuring being very short. Since the time of measuring the moving object with the new laser telemeters is nearly immediate, all measured values (slope distance, reduced distance, horizontal and vertical angles) can be read at any instant on the digital dial. That means that the value of the direct distance between the instrument and the float is obtained at any instant if the float is followed by universal reflector.

The needed elements for calculation of all three co-ordinates of an arbitrary point on the water surface have been obtained by measuring the horizontal connecting angle, the vertical angle, and slope distance if the instrument is at the determined point with known co-ordinates. In other words, this arbitrary point on the water surface is completely determined in the space. This main characteristic of the invention—the determination of the arbitrary point—is the innovation over the former methods by which the arbitrary point could be determined only by x, y co-ordinates. The position of the streamline (trajectory) is completely determined in the space by the new data as well as the fall in the streamline—that is, the falls between measured points.

A further the characteristic of the universal reflector according to the invention, which has been used for electro-optical and laser telemeters, is the fact that the velocity of its moving at the moment of surveying can be calculated according to the read time at any instant of the surveying if the telemeter used has an accurate chronometer. This characteristic enables the calculation of the value of very important hydraulic section velocity—that is, the velocity between two consecutive moving positions of the float. It is obvious that the time interval between two surveyed positions of the float with the reflector may serve for calculation of the middle section velocity at that interval.

In the former methodologies the surface velocity was measured by means of the float mainly according to the direction, and the travelling time of the float between two directions at the determined mutual length was registered. It is evident that it was some middle velocity which was never strictly bound to determined streamline, and, at curves or at other non-typical cases, the actual velocity was not closely approximated by this method. However, by the the method of measuring the velocity of the float with the universal reflector, all data necessary for maximum definition and description of streamlines and trajectories have been obtained.

Considerable advantage has been achieved in automatic registration of data when measuring by electro-optical instruments. The data are registered by means of different devices, which very often are directly connected to corresponding calculators. The registration speed, that is, the frequency in the time unit is significant (at some types of devices it reaches even 10-15 registrations per sec), since the higher the frequencies, the greater the number of surveyed points at the streamline. Automatic registration of data makes the operator's work easier, since he does not have to read all the data from the instrument, but merely has to follow the float precisely. The density of registration is adjusted on the corresponding automatic device, and it has been found that it is possible to survey even at higher speed, probably even to the order of magnitude of 10-15 m/sec, which permit measurement of quick currents and flows around the objects in river. The possibility of measurements in the rivers has been considerably widened by this, as the subject method enables the measurements of velocity with accuracy and economy.

The importance of all these values and their accurate and precise measurements is of a great theoretical and practical meaning in fluvial hydrotechnics and theoretical hydraulics concerning water currents, seas, lakes and water structures as: dams, bridges, sluices, overflows etc. These measurements can be carried out completely by the universal reflector according to the invention, which provides a most convenient means to perform the measurements by electro-optical and laser telemeters without significant corrections and changes.

BRIEF DESCRIPTION OF THE DRAWINGS

The invention will be clearly shown in FIGS. 1, 2, 3, 4 and 5:

FIG. 4 shows only the reflector of composed pyramids without the upper connecting base in sight from above from the FIG. 3 with the projection of one pyramid from the upper and lower wreath with the main normals, and FIG. 5 shows the reflector in section A—A from the FIG. 4, the upper base of the reflector is added and shown.

DETAILED DESCRIPTION OF THE PREFERRED EMBODIMENTS

Figure 1:
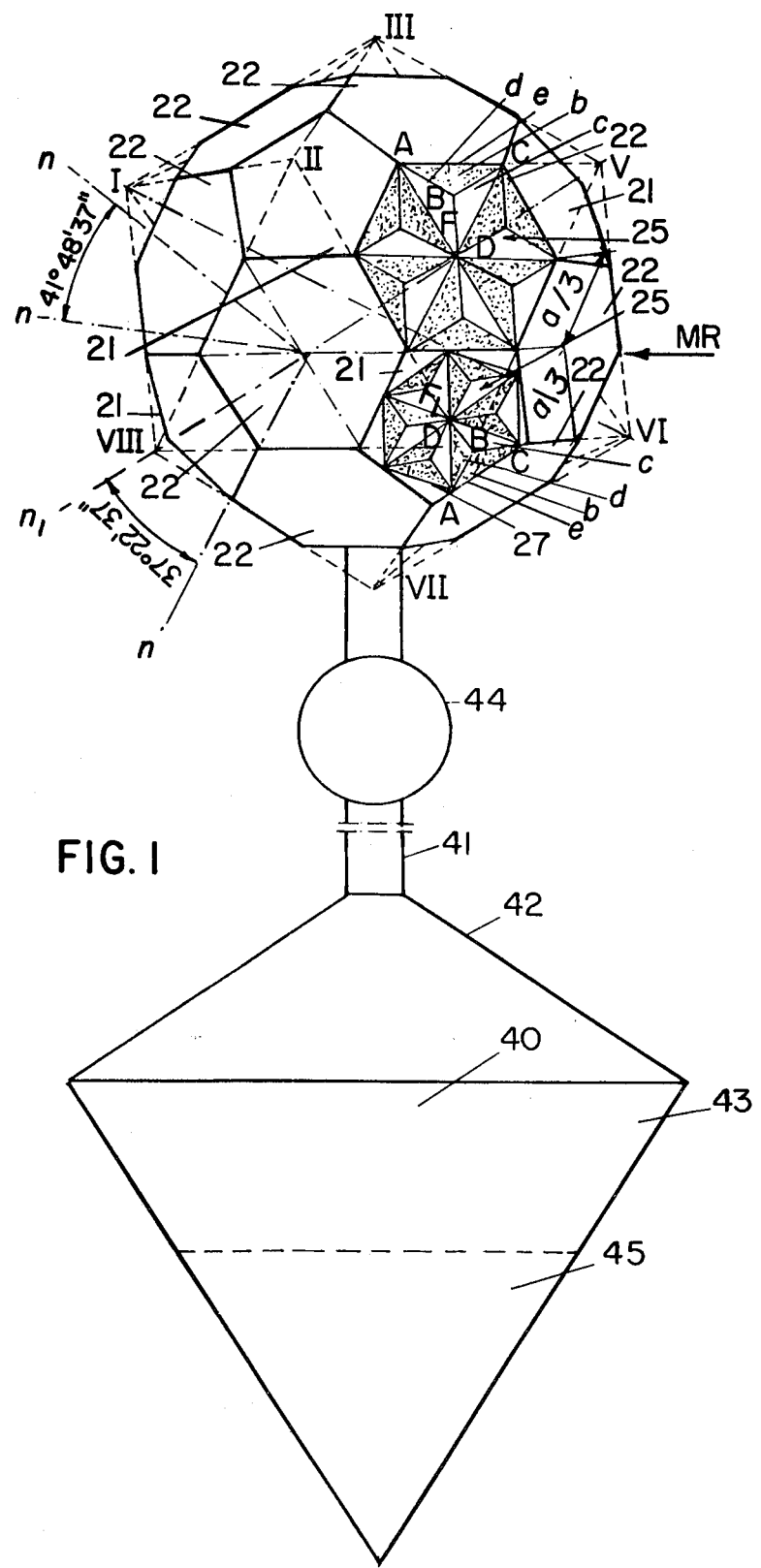
FIG. 1 shows a first embodiment of a universal reflector of electromagnetic waves mounted on a float with trilateral pyramids placed only on one pentagon and hexagon of the reflector.
Figure 2:
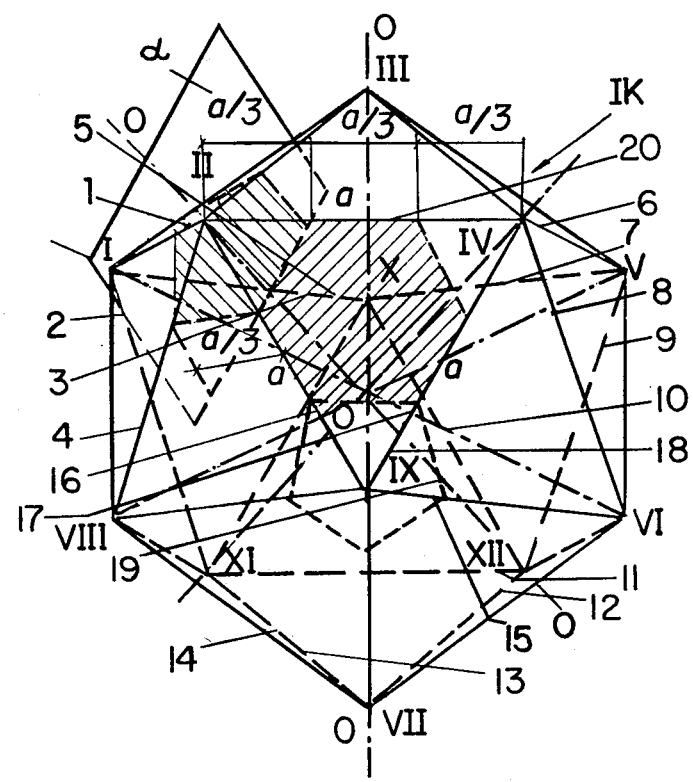
FIG. 2 shows the regular icosahedron with the plane by which one solid angle has been cut off.

In FIGS. 1 and 2, the first embodiment of the universal reflector of electromagnetic waves is derived from the regular icosahedron IK (FIG. 2). It is the regular polydedron which consists of twenty sides 1-20, in the shape of an equilateral triangle whose sides are a. The regular icosahedron IK has twelve solid angles I-XII. Around the icosahedron IK the sphere can be circumscribed and inscribed into it. If the solid angles I-XII are cut by one plane α which is normal to one of the axes 0—0 which passes through the apex of any of the solid angles I-XII and through the center 0, in such a way that the sides a of the triangles 1-20 have been cut at a length a/3, and the cut off parts of the solid angles I-XII have been thrown away, on the plane α section one regular pentagon 21 will be obtained whose every side will be a·a/3. Twelve pentagons 21 are obtained if the same procedure is carried out on all solid angles I-XII.

From the surface of each side 1-20, that is from equilateral triangle of the icosahedron IK, one regular hexagon 22 will be left, whose side is a/3, and there are twenty such hexagons 22. The body which has been obtained in this way could be named modified icosahedron MI.

The normal n, drawn to the surface of any hexagon 22, and the normal $n_1$ drawn on the surface of the neighboring pentagon 21 form the angle of 37° 22' 37".

The normals n drawn to the two neighbouring hexagons 22 form the angle of 41° 48' 37" which is at the toleration limit but still acceptable.

Into the plane of each of twenty hexagons 22 with their equilateral triangle bases e, six regular trilateral pyramids 25 are placed (in the references they are called: triple prisms, cube prisms or retrodirected prisms). Geometrically they are regular trilateral pyramids whose lateral sides b, c and d have been cut by normal angle. The base of the pyramid e is the equilateral triangle. Such trilateral pyramid 25 is obtained when the solid angle of the cube is cut by the plane which is normal to the diagonal of the cube. The regular trilateral pyramid 25 has the characteristic that the optical light beams which fall on the base e and form with the main normal the angle up to ±20°, reflect themselves in parallel to the direction of incoming beam. Starting from this characteristic of the regular trilateral pyramid 25, applicants have looked for a geometrical body on which it is possible to place a great number of pyramids 25 under the condition that the main normals of the neighbouring pyramids 25 form the angle up to 40°, since, in this case, one of the pyramids 25 would always reflect the beam in parallel to the direction of incoming beam. This is the reason that the regular icosahedron IK has been taken as the geometrical base of such disposal.

The trilateral pyramids 25 are disposed on the surface of the hexagon 22 in a way that the lateral sides b, c and d are spread and inclined to the center F of the hexagon 22, that is, the apexes B and D are closer to the center F of the hexagon 22, and one edge of the base e lies along the side of the hexagon 22. The base e of the pyramid 25 is the equilateral triangle whose sides are equal to the sides of the hexagon 22 and are a/3, that is, ⅓ from the side of the equilateral triangle 1-20 of the icosahedron IK. The total surface sum of all six bases e of the pyramid 25 has the same optical effect as one pyramid with the same base surface.

In the same way in every pentagon 21 there are six pyramids 25 in the inscribed circle of the pentagon 21. They are regular trilateral pyramids 25. The total surface of all bases e is slightly reduced in that way, the sides b, c and d of every pyramid 25 are spread and inclined to the center $F_1$ of the hexagon 27 in the pentagon 21. By constructive solution, however, it can easily be managed that the surfaces on the hexagons 22 and pentagons 21, which are needed for effective reflection of the electromagnetic waves, that is, electro-optical light beams, are approximately the same.

It is obvious from the previous presentation that the modified icosahedron MI is the universal reflector of electromagnetic waves according to its optical action, as it fulfils the demanded task and conditions because it reflects the electromagnetic waves in parallel to the direction of the incoming wave in any position. If it is applied with electro-optical-light telemeters, it can reflect the emitted beam back to the instrument-receiver in any position.

The reflector MR is mounted on the float 40 by means of the holder 41. The float 40 may have different shapes. Among these possibilities, according to the stability, the float 40 is the best; the upper part 42 and the lower part 43 are cone-shaped. Between the float 40 and the reflector MR there is the sight-mark 44 on the holder 41. The float 40 is a kind of "submerged float" with maximum stability because the mass gravity is under the displacement of gravity. Such a float 40 is less sensitive to surface waves than are some known floats. The float 40 is made of light alloy, it has ballast mass 45 at the bottom of the cone 43—lead or some other heavy material.

Figure 3:
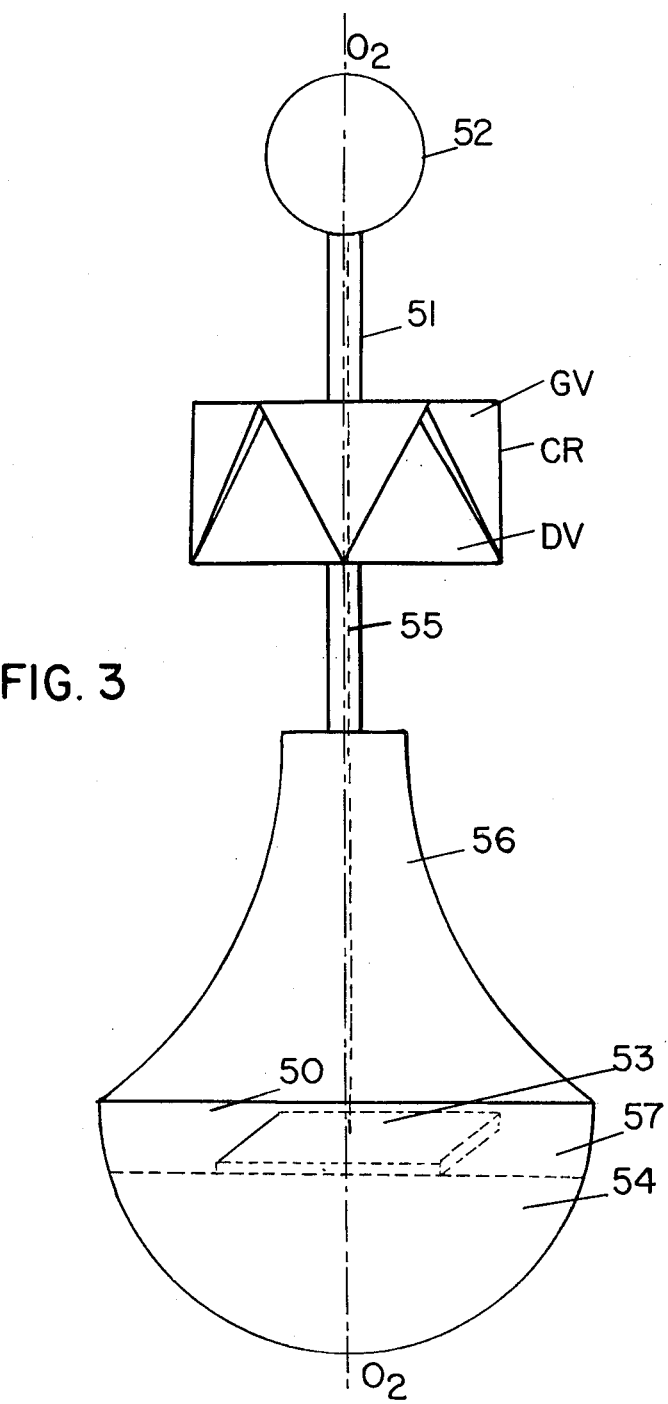
FIG. 3 shows a second embodiment of the universal reflector of electromagnetic waves mounted on a float.

The float 40 is an axisymmetrical object. When it moves downstream, along the streamline, it may arbitrary turn around its own vertical axis because it has one degree of freedom. However, the vertical angles which are measured in rivers, seas, etc. range from 1°-6° at far distances and up to 20° at nearer ones. Starting from these two conditions, the solution for the universal reflector has been obtained, according to a second embodiment, following other principles. In the second embodiment, the cylinder has been taken for the geometrical base, its axis being the extension of the vertical axis of the float. Thus, the second embodiment could be called the cylindrical reflector CR (FIGS. 3-5).

The universal reflector of electromagnetic waves mounted on the float, according to the second embodiment, is constructively suitable for surveying at night. It consists of the cylindrical reflector CR which is mounted on a holder 51. The holder 51 is connected with its lower part to the upper part 56 of the float 50, this upper part 56 being formed in the shape of single hyperboloid, cut in the middle by the plane which is normal to its vertical axis. Downward from the upper part 56 the hemispherical part 57 continues. On the upper end of the holder 51, above the reflector CR, there is a bulb 52 which is by the line 55 plugged through the holder 51 in the battery or electric battery 53 which is placed in the lower hemispherical part 57, that is in the cavity of the float 50. The ballast 54 is placed at the bottom of the float 50 on account of stability. If the reflector is not used for night surveying, a brightly painted hemisphere could be mounted on the holder 51 instead of the bulb 52; the colour would make sighting the float easier during surveying by daylight.

There is a lower wreath DV on the cylindrical reflector CR with six regular trilateral pyramids 25' with apexes A', B', C', D', which are placed concentrically to the base A so that the main normals $n_2$ lie in one plane $\beta$ which is normal to the axis $0_2$—$0_2$ or to the base e' of the pyramids 25'. That means that the planes where the bases e' of the pyramids 25' lie are parallel to the axis $0_2$—$0_2$. The side a' of the base e' of the pyramids 25' is equal to the radius $r_1$ of the circle in which the sides a' of the base e' are placed as chords. By that the main normals $n_2$ of the pyramids 25' form the angle of 60°.

In the upper wreath GV on the upper base B looking upward, according to the same principle, six regular trilateral pyramids 25" are placed with the apexes A", B", C" and D", one of the pyramids 25" by lateral sides b" and d" is inserted between lateral side b' of one pyramid 25' and the lateral side d' of its neighbouring pyramid 25' from the lower wreath DV. However, because of the problem how to fit in the pyramids 25" from the upper wreath GV between the pyramids 25' in the lower wreath DV, the main normals $n_3$ of the pyramids 25" from the upper wreath GV, lie on the cone surface, that is, the bases e" of the pyramids 25" are slightly inclined toward the axis $0_2$—$0_2$, looking upward. The main normals $n_3$ of the pyramids 25" from the upper wreath GV with the main normals $n_2$ of the pyramids 25' from the lower wreath DV close the angle of 17° 50' between themselves. That means that the pyramids 25' from the lower wreath DV will be able to reflect all the optical beams which had been emitted in the range of the vertical angle from 0°–20°. The orientation of the main normals $n_3$ of the pyramids 25" from the upper wreath GV enables parallel reflection of the optical beams which have been emitted under the vertical angle of maximum to 37°.

An important conclusion from all this is that the position of the main normals $n_3$ of the pyramids 25" from the upper wreath GV does not enable the range of possible vertical angles which is from 0°–25° for the pyramids 25' from the lower wreath DV.

The next important characteristic of such a construction is that the normals $n_3$ of the pyramids 25" from the upper wreath GV and the normals $n_2$ of the pyramids 25' from the lower wreath DV close the angle of 30° in horizontal projection. Accordingly, the angles between each pair of normals $n_2$ and $n_3$ satisfy the previously mentioned limits—that is, they are smaller than 40°. In that way the construction of the cylindrical reflector CR can satisfy the demands for measuring the float distance using electro-optical and laser telemeters.

If the side of the base e" of the pyramid 25" from the upper wreath GV is equal to a", then the circumscribed circle around the hexagon 28 will have the radius $r_2$ which is equal to a". The side a' of the base e' of the pyramid 25' from the lower wreath DV will be equal to 1,1 a", that is, equal to 1,1 $r_2$, and the bases e' of laid pyramids 25' from the lower wreath DV will form tangential hexagon 29 on the circle with the radius $r_1$ which is equal to side a' of the base e'.

The pyramids 25' and 25" with their lateral sides b', c', d', that is, b", c", d", are spread and inclined toward the central axis $0_2$—$0_2$ of the cylindrical reflector CR which is formed of composed pyramids 25' and 25".

Trilateral pyramids 25, 25', 25" can be made of glass. The sides of the pyramids 25, 25', 25", which have the function of reflection, are specially treated and polished. They could also be made of some artificial materials. There are so-called commercial prisms in mass production in which it is possible to soak the light flux by them even to 30%. There are some laser optics with coefficient of reflection of 98% for greater demands. The quality of optical surface treatment for special mirrors and pyramids expressed in wavelength comes to the treatment accuracy $\lambda/200$, where $\lambda$ is the wavelength of the used light.

The size of trilateral pyramids 25, 25' and 25" as the basic elements of the mentioned reflectors depends on the power and the wavelength of the used electrooptical telemeter or laser. The size is very often expressed by the size of the needed surface for reflection, since this the size of the base e, e' and e" is automatically determined.

As there exists a geometrical connection between the size of the sides of the base e, e' and e" of the pyramids 25, 25' and 25" and of modified reflector MR and the cylindrical reflector CR, that is the way to get the size of the sides of the base e, e' and e" and the total weight of both reflectors MR and CR. According to the weight of MR or CR reflectors, the size of the float is determined by needed additions and corrections according to the stability, that is, building-in the ballast weight in the bottom of the float to achieve the maximum stability.

It is possible to combine both floats 40 and 50, and other shapes as well, with both reflectors MR and CR in accordance to the circumstances and demands.

Changes could be performed on the universal reflector of electromagnetic waves mounted on the float according to the invention, some changes in dimension, choice of materials, change in shapes of some elements, especially floats and it could be applied for other purposes, but not to exceed the limits of this invention.

I claim:

1. A reflector for electromagnetic radiation which reflects radiation from any arbitrary angle in three dimensions in parallel to incoming radiation to within approximately ±20°, said reflector comprising:
   (a) a reflector body in the shape of a modified icosahedron having twenty regular hexagonal surfaces and twelve regular pentagonal surfaces;
   (b) six regular trilateral pyramids formed on each of the twenty regular hexagonal surfaces, one edge of each of the trilateral pyramids being one edge of the associated hexagonal surface and the vertex of the trilateral pyramid opposite said one edge thereof being the center of the associated hexagonal surface; and
   (c) six regular trilateral pyramids formed on each of the twelve regular pentagonal surfaces, one edge of one of the trilateral pyramid being a part of one edge of the associated pentagonal surface and the vertex of the trilateral pyramid opposite said one edge thereof being the center of the associated pentagonal surface.

2. A reflector as recited in claim 1 and further comprising:
   (a) a float and
   (b) a sight-mark,
said reflector body and said sight-mark being mounted on said float.

3. A reflector for electromagnetic radiation which reflects radiation from any arbitrary angle is a plane perpendicular to the axis of the reflector in parallel to incoming radiation to within approximately ±20°, said reflector comprising:

(a) a reflector body generally in the shape of a cylinder the axis of which forms the axis of the reflector, the exterior surface of the reflector body being formed from a first wreath of six regular triangular surfaces the normals to which project from the axis of the reflector at a first uniform angle and a second wreath of six regular triangular surfaces the normals to which project from the axis of the reflector at a second uniform angle, the normals to the first and second wreaths both being very nearly perpendicular to the axis of the reflector and the difference between the first and second uniform angles being approximately 17° 50′;

(b) a regular trilateral pyramid formed on each of the six regular triangular surfaces of the first wreath, each triangular surface forming the base of the associated regular trilateral pyramid; and (c) a regular trilateral pyramid formed on each of the six regular triangular surfaces of the second wreath, each triangular surface forming the base of the associated regular trilateral pyramid.

4. A reflector as recited in claim 3 and further comprising:
(a) a float and
(b) a sight-mark,
said reflector body and said sight-mark being mounted on said float.

5. A reflector as recited in claim 4 and further comprising:
(a) a bulb mounted on said float and
(b) a battery operatively connected to said bulb and mounted in said float or said reflector body.

* * * * *